(12) United States Patent
Jeong (10) Patent No.: US 11,192,158 B2
(45) Date of Patent: Dec. 7, 2021

(54) APPARATUS FOR DETECTING RELATIVE POSITIONING INFORMATION BETWEEN ROLLS, AND METHOD FOR MEASUREMENT ROLL ALIGNMENT STATE BY USING SAME

(71) Applicants: PCM SOLUTION CO., LTD., Cheongju-si (KR); PCM TECH CO., LTD., Cheongju-si (KR)

(72) Inventor: Hong Seok Jeong, Cheongju-si (KR)

(73) Assignees: PCM SOLUTION CO., LTD., Cheongju-si (KR); PCM TECH CO., LTD., Cheongju-si (KR)

( * ) Notice: Subject to any disclaimer, the term of this patent is extended or adjusted under 35 U.S.C. 154(b) by 0 days.

(21) Appl. No.: 17/264,663

(22) PCT Filed: Jul. 16, 2019

(86) PCT No.: PCT/KR2019/008745
§ 371 (c)(1),
(2) Date: Jan. 29, 2021

(87) PCT Pub. No.: WO2020/075955
PCT Pub. Date: Apr. 16, 2020

(65) Prior Publication Data
US 2021/0331224 A1   Oct. 28, 2021

(30) Foreign Application Priority Data
Oct. 8, 2018 (KR) .......................... 10-2018-0120062

(51) Int. Cl.
*B21B 38/00* (2006.01)
*G01B 11/27* (2006.01)

(52) U.S. Cl.
CPC ............ *B21B 38/00* (2013.01); *G01B 11/272* (2013.01)

(58) Field of Classification Search
CPC ...................................................... B21B 38/00
(Continued)

(56) References Cited

U.S. PATENT DOCUMENTS 5,227,864 A *  7/1993  Yowler ................ G01C 15/004
                                                             356/400
2004/0093747 A1   5/2004  Lysen
(Continued)

FOREIGN PATENT DOCUMENTS

JP      2014074683 A      4/2014
KR      101191458 B1     10/2012
(Continued)

*Primary Examiner* — Tarifur R Chowdhury
*Assistant Examiner* — Omar H Nixon
(74) *Attorney, Agent, or Firm* — Rabin & Berdo, P.C.

(57) ABSTRACT

The present invention relates to an apparatus for detecting relative positioning information between rolls, and a method for measuring a roll alignment state by using same, and to an apparatus for detecting relative positioning information between rolls, and a method for measuring a roll alignment state by using same, the apparatus outputting a measurement result in real time so that a measurer can easily recognize the degree of parallelism and the degree of horizontality of a roll when a roll process line is formed, and thus an inter-roll alignment state can be checked or a measurement roll can be corrected according to the alignment state.

2 Claims, 8 Drawing Sheets

(a)

(b)

(58) Field of Classification Search
USPC ......................................................... 356/138
See application file for complete search history.

(56) References Cited

U.S. PATENT DOCUMENTS

| | | | |
|---|---|---|---|
| 2004/0126678 A1* | 7/2004 | Baek ...................... | G02B 5/201 |
| | | | 430/7 |
| 2005/0057743 A1* | 3/2005 | Seiffert .................. | G01B 11/27 |
| | | | 356/138 |

FOREIGN PATENT DOCUMENTS

| | | | | |
|---|---|---|---|---|
| KR | 101628955 B1 | 6/2016 | | |
| KR | 101846514 B1 | 4/2018 | | |
| WO | WO-2017034087 A1 * | 3/2017 | ............... | G01C 9/00 |

* cited by examiner

APPARATUS FOR DETECTING RELATIVE POSITIONING INFORMATION BETWEEN ROLLS, AND METHOD FOR MEASUREMENT ROLL ALIGNMENT STATE BY USING SAME

TECHNICAL FIELD

The present invention relates to an apparatus for detecting relative positioning information between rolls and a method for measurement roll alignment state by using the apparatus. In more detail, the present invention relates to an apparatus for detecting relative posture positioning information between rolls in which the apparatus outputs a measurement result in real time so that a measurer can easily recognize the alignment state of a roll, that is, the degree of parallelism and the degree of horizontality of a measurement roll to be measured with respect to a subject roll when constructing a roll process line including sequential rolls such that the alignment state between rolls can be checked and the measurement roll can be corrected in accordance with the alignment, wherein a laser signal, which is discharged from a subject position fix unit mounted on the subject roll, is reflected in a relative position measurement unit mounted on the measurement roll so that the alignment state is detected using the data of the reflected laser signal to minutely output the alignment state between rolls even by a sensor having predetermined resolution regardless of the distance between the rolls and the lengths of the rolls. Further, the present invention relates to a method of measurement roll alignment state using the apparatus.

BACKGROUND ART

In general, rolls are essentially used in various roll-to-roll processing (R2R) equipment and rolling mills etc. which are used in the manufacturing process of steel products or films. Since these rolls have a continuity from the inlet to the outlet for each line of factories, the alignment of the equipment is very important.

The rolls in the production lines of film or rolling mill factory serve to change the direction of the strip or apply tension.

Therefore, if the alignment and level of the rolls are not precisely made with respect to the center line in the direction in which the strip travels, a meandering phenomenon in the product occurs in which it is shifted to either side of the center line in the direction in which the strip travels. Also, this eventually causes wrinkles, waveforms, overlapping, and thickness deviation of the product, and causes the film to break during operation, resulting in a problem of lowering productivity such as production suspension.

Since these rolls are consumables, maintenance and repairs such as repair and replacement are required when used for a certain period of time. Also, they are managed according to strict standards to optimally maintain the progress of the strip due to the characteristics of continuous lines.

Therefore, there is a need for a measuring device capable of measuring and correcting the alignment of rolls, that is, parallelism and horizontality.

Figure 8:
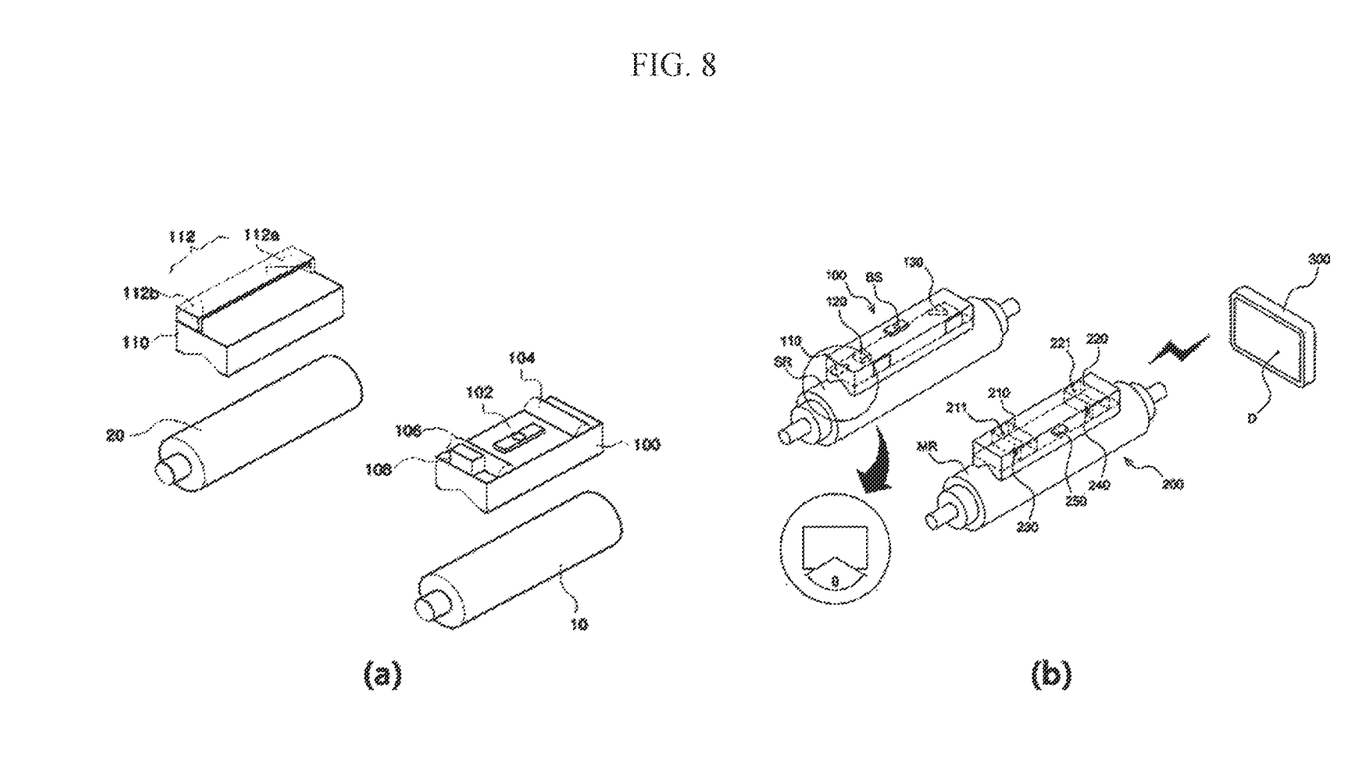
FIG. 8 shows a representative diagram of the prior art for an apparatus for detecting relative positioning information between rolls and a method for measurement roll alignment state by using the apparatus according to the present invention.

Thus, as a prior art related to the apparatus for detecting relative positioning information between rolls, and a method for measuring a roll alignment state by using the same, "a position information detection device for roll and a measurement method thereof" of Korean Patent Registration No. 10-1628955 (hereinafter referred to as 'Patent Literature 1') is disclosed as shown in FIG. 8 (a).

Patent Literature 1 relates to a position information detection device for roll and a measurement method thereof to easily measure horizontality and parallelism of a roll with a minimum workforce without being restricted by a state of installation and location of a roll system by including a fixed jig including a laser receiving unit and a laser transmitting unit mounted on a subject roll, sensing a distance information and a sensor unit storing a laser signal; a moving jig mounted on a measurement roll spaced apart from the subject roll to convey the laser signal to the laser receiving unit by perpendicularly reflecting the laser signal; and a control part controlling the laser receiving unit and the laser transmitting unit, collecting data by receiving a distance value measured by the sensor unit to generate a corresponding relationship between an image information and the distance information, thereby determining the horizontality and parallelism of the measurement roll.

As another prior art, "an apparatus for measuring an alignment state between rolls and a measuring method using the same" of Korean Patent Registration No. 10-1846514 (hereinafter referred to as 'Patent Literature 2') is disclosed as shown in FIG. 8 (b).

Patent Literature 2 relates to an apparatus for measuring an alignment state between rolls and a measuring method using the same comprising: a first reference detector including a reference inclination sensor seated on one side of the outer periphery of a subject roll and provided to emit two or more laser signals to the measurement roll to be aligned with respect to the subject roll; a second measurement detector seated on one side of the outer periphery of the measurement roll and provided to allow the two or more laser signals from the first reference detector, which is seated on the subject roll, to be emitted, converting the emitted laser signals into information, and transmitting the information to an arrangement detection control unit; and the arrangement detection control unit receiving information related to the laser signals transmitted from the second measurement detector, calculating a correspondence relationship between image information and distance information based on the received information, and confirming/determining the arrangement state of the measurement roll with respect to the subject roll, wherein the first reference detector includes a laser transmitting unit from which a laser signal is emitted; a beam splitter reflecting unit configured to receive the laser signal emitted from the laser transmitting unit, partially reflecting at right angles, and transmitting at a right angle to divide the laser signal into a splitter reflecting laser signal and a right angle reflecting trend laser signal; a right angle reflecting unit positioned to be spaced apart from the beam splitter reflecting unit by a predetermined distance and receiving a laser signal transmitted from the beam splitter reflecting unit, that is, a right angle reflecting trend laser signal to reflect it at a right angle; and a reference inclination sensor formed on one side of the upper surface of the first reference detector, which measures the absolute value of the horizontality based on the sea level to check the horizontality of the subject roll, on which the first reference detector is seated, wherein the second measurement detector includes a first laser receiving unit having a first laser target unit having a predetermined area to which the splitter reflecting laser signal emitted from the first reference detector is irradiated; a second laser receiving unit having a second laser target unit having a predetermined area to which a right angle reflecting trend laser signal emitted from the first reference detector is irradiated; a first laser sensing unit formed by either a charge coupled device image sensor or a complementary metal oxide semiconductor image sensor, which stores a splitter reflecting laser signal irradiated to the first laser receiving unit as an image; a second laser sensing unit formed by either a charge coupled device image sensor or a complementary metal oxide semiconductor image sensor, which stores the right angle reflecting trend laser signal irradiated to the second laser receiving unit as an image; and a laser signal transmitting unit for transmitting the information stored in the first laser sensing unit and the second laser sensing unit to an alignment detection control unit, and wherein the alignment detection control unit includes a laser signal receiving unit for receiving information on the laser signal transmitted from the second measurement detector; and a roll alignment state calculating unit that calculates a correspondence relationship between image information and distance information based on the information received by the laser signal receiving unit, the alignment detection control unit is mounted on the second measurement detector or outputted to an output device including a separate display unit capable of communication, so that the correspondence relationship between the image information and the distance information is converted into coordinates, whereby visually recognizing the alignment of the roll.

Patent Literature 1 and Patent Literature 2 are technologies related to a measuring device and a measuring method for measuring an alignment of a measurement roll with respect to a subject roll using a laser and are prior arts of the present applicant, which was applied and registered on Aug. 26, 2015 and Dec. 12, 2017, respectively.

Accordingly, the present invention is an improved invention of improving the above Patent Literature 1 and Patent Literature 2 and the technical characteristics thereof are different from each other.

To be more specific, Patent Literature 1 has a configuration in which the laser signal emitted from the laser transmitting unit of the fixed jig to the moving jig is reflected by the moving jig and irradiated back to the laser receiving unit of the fixed jig to measure the alignment of the measurement roll, a first reflector and a second reflector are formed therein to refract and return the laser signal.

Patent Literature 2 has a configuration in which it divides and reflects the laser signal emitted from the laser transmitting unit in the first reference detector and the divided and reflected signal is irradiated to the first laser receiving unit and the second laser receiving unit of the second measurement detector, respectively so as to measure the alignment of the measurement roll, the beam splitter reflecting unit and the right angle reflecting unit for dividing and reflecting the laser signal are formed in the first reference detector.

That is, in Patent Literature 1 and Patent Literature 2, the apparatus mounted on the measurement roll (the apparatus that receives the laser) receives the laser signal emitted from the apparatus (the apparatus that emits the laser) mounted on the subject roll as it is, and the received laser signal is converted into data to output the alignment state thereof.

At this time, since the relationship between the subject roll and the measurement roll, that is, the distance between the rolls and the length of the roll itself on which the apparatus is mounted, is closely related to the measurement capability of the apparatus, the accuracy of the measured alignment may vary depending on the distance between the rolls, the length of the roll, and the resolution of the sensor. In consideration of this, Patent Literature 1 and Patent Literature 2 are limited in being effectively used in the field unless a sensor having a high resolution is installed.

In addition, approaching from the viewpoint of solving the problems arising from Patent Literature 1 and Patent Literature 2, in Patent Literature 1, in the process that the laser signal transmitted from the laser transmitting unit formed in the fixed jig is reflected at a right angle from the reflecting unit formed in the moving jig and is returned to the laser receiving unit formed in the fixed jig, the laser signal transmitted from the laser transmitting unit must be irradiated at the correct location of the first reflector. Therefore, measuring the alignment of the measuring the rolls at a certain distance from the subject roll takes a long time because it is difficult to adjust the position so that the laser signal can be irradiated to the exact center point of the first reflector. In particular, this raises a problem in terms of ease of measurement that makes handling difficult except for skilled workers.

Therefore, in order to compensate for the problems of Patent Literature 1, the applicant of the present invention had invented the measuring apparatus in which the laser signals emitted from the laser transmitting unit in the Patent Literature 2 is divided into two through the beam splitter reflecting unit and the right angle reflecting unit, but always keeps a parallel state. In this way, the role is divided by means of allowing only the laser to be emitted from one device and the other device to receive the emitted laser, so that the laser is irradiated at the correct position of the first reflector of Patent Literature 1, thereby solving the problem of the position adjustment work. However, when applied in the field, another problem occurred only in the Patent Literature 2.

At this time, in Patent Literature 2, since the alignment state of the measurement roll with respect to the subject roll which is outputted as coordinates, uses an absolute value, it is impossible to measure the distance of the measurement roll based on the subject roll. Therefore, there is another problem in that it is difficult to immediately check measurement information on whether the measurement roll is inclined in the direction of the subject roll or in a direction away from the subject roll, only with the output coordinates (if the irradiation location, at which the laser of the subject roll is irradiated to the laser receiving unit constituted in the measurement roll, is the same, it cannot be determined whether the measurement roll is inclined in a direction away from the subject roll or close to the subject roll).

In addition, there is still a problem that the accuracy of the measurement result is increased only when a sensor having an advanced resolution is installed.

That is, when the parallelism of the measurement roll with respect to the subject roll is measured in Patent Literature 2, there is a problem in that the measurer does not immediately recognize whether it measurement roll is inclined in a direction closer to the subject roll or inclined in a direction away from the subject roll based on only the coordinate values of the output parallelism. In addition, there is another problem in that an expensive measuring device is inevitably provided due to high-resolution sensors.

In order to solve this problem, for example, in Patent Literature 2, a separate algorithm or a separate component must be added to derive a perspective relationship between the subject roll and the measurement roll by detecting the spot size of the irradiated laser signal so that the measurer can recognize the alignment with the parallelism of the measurement roll. In this case, there is a problem that cannot be solved simply because it is necessary to establish an organic coupling relationship with the existing components.

Also, a limitation of the measurement range due to the difference in the resolution of the sensor cannot be easily solved.

Accordingly, the present invention is an improved invention improved by using Patent Literature 2 as a background technology in order to simultaneously solve the fatal problems of Patent Literature 1 and Patent Literature 2. Also, it is possible to maintain the accuracy and precision of information on the alignment of the rolls, regardless of the distance between the rolls and the length of the rolls, even with a constant (general) resolution of the sensor, by simplifying the components and by changing the idea. At the same time, it is an invention that improves the ease of measurement by a measurer so that the perspective relationship between the subject roll and the measurement roll can be known at once.

Therefore, the present invention is a technology in which the problems of Patent Literature 1 to the Patent Literature 2 are improved in terms of hardware and software, and although some of the components of constituting the invention are the same in that it is an invention by the same applicant, since there are differences in the conventional problems to be solved by the invention, the core configuration of the invention for solving the problem, the subject of the invention to be solved, and the effects to be exhibited, the technical characteristics thereof are different from each other.

PATENT LITERATURE

Patent Literature 1: Korean Patent Registration No. 10-1628955 (Jun. 2, 2016)
Patent Literature 2: Korean Patent Registration No. 10-1846514 (Apr. 2, 2018)

DISCLOSURE

Technical Problem

The present invention has been made in an effort to solve the problems in the related art, and an objective of the present invention is to provide an apparatus for detecting alignment of a roll which is improved such that a measurement roll can be quickly and accurately aligned with respect to a subject roll by easily checking the alignment state of rolls when constructing a roll process line including rolls continuously installed.

Another objective of the present invention is to provide an apparatus for detecting alignment of a roll which is improved such that even people who are not professional can align rolls by immediately checking the alignment state of the rolls.

Another objective of the present invention is to provide an apparatus for detecting alignment of a roll which is improved to make it possible to immediately recognize a relation of distance between a subject roll and a measurement roll when measuring the degree of parallelism of the alignment of the measurement roll with respect to the subject roll.

Another objective of the present invention is to provide a method detecting alignment of a roll which simply measures alignment state, that is, the degree of parallelism and the degree of horizontality of a measurement roll with respect to a subject roll using apparatus for detecting alignment of a roll so that the measurement roll can be quickly and accurately aligned.

Technical Solution

According to one aspect of the present invention so as to accomplish these objects, there is provided to an apparatus for detecting relative positioning information between rolls, including: a subject position fix unit mounted on a subject roll that is the reference of measurement and discharging a laser signal to a measurement roll to be measured; a relative position measurement unit mounted on the measurement roll to be measured and receiving the laser signal from the subject position fix unit; and a detection result output unit that receives information about the laser signal from the relative position measurement unit, calculates the alignment state of the measurement roll with respect to the subject roll, and outputs the alignment state to a display, wherein the relative position measurement unit includes:

a first laser receiver that receives a first laser signal from the subject position fix unit;

a second laser receiver that receives a second laser signal from the subject position fix unit; and a third laser receiver that reflects and receives the first laser signal discharged from the subject position fix unit, wherein the third laser receiver includes:

a received-laser signal reflection module that passes and reflects the first laser signal discharged from the subject position fix unit such that the passed first laser signal is radiated to the first laser receiver and the reflected laser signal generated by reflection is radiated to a reflected-laser signal reception module;

the reflected-laser signal reception module to which the reflected laser signal is radiated; and a reflected-laser signal sensor module that stores the reflected laser signal radiated to the reflected-laser signal reception module into data, and wherein the alignment state of the measurement roll with respect to the subject roll is output to the display in real time on the basis of data transmitted from the relative position measurement unit.

In addition, there is provided to a method for measuring alignment state of a roll using an apparatus for detecting relative positioning information between rolls, the method including:

a subject position fix unit mounting step of mounting a subject position fix unit on a subject roll that is the reference for measurement;

a relative position measurement unit mounting step of mounting a relative position measurement unit on a measurement roll of which alignment is measured;

a laser signal discharging step of discharging a laser signal from the subject position fix unit;

a laser signal receiving step composed of a first laser signal receiving step of receiving a first laser signal, a second laser signal receiving step of receiving a second laser signal, and a third laser signal receiving step of receiving a reflected laser signal from the discharge laser signal, the first, second, and reflected laser signals being radiated from the relative position measurement unit;

a laser signal information detecting step of making the received laser signal into data;

a laser signal data transmitting step of transmitting the data of the laser signal to the detection result output unit;

a measurement roll alignment state calculating step of calculating alignment state of the measurement roll;

a measurement result output step of outputting in real time the alignment state of the measurement roll to a display; and a measurement roll aligning step of aligning the measurement roll, wherein the first laser signal receiving step receives first laser signal that has passed through the received-laser signal reflection module, wherein the third laser signal receiving step includes:

a reflected-laser signal generating step of generating the reflected laser signal from the first laser signal by means of the received-laser signal reflection module; and a reflected-laser signal receiving step of receiving the reflected laser signal, whereby when a process line including several rolls continuously installed is formed, the alignment state of the rolls, that is, the degree of parallelism and the degree of horizontality of the measurement roll based on the subject roll are measured to align the measurement roll on the basis of the measurement result, so a process line with excellent alignment state of rolls is achieved.

In the meantime, it should be understood that the terminology or the words used in claims should not be interpreted in normally or lexically sense. It should be interpreted as meaning and concept consistent with the technical idea of the present invention, based on the principle that the inventor can properly define the concept of the term in order to describe its invention in the best way.

Therefore, the embodiments described in the present specification and the configurations shown in the drawings are only the most preferred embodiments of the present invention, and not all the technical ideas of the present invention are described. Therefore, it is to be understood that various equivalents and modifications are possible.

Advantageous Effects

According to the present invention as described above in the above configuration and operation, when constructing the roll process line in which rolls are continuously installed, the alignment of the rolls is easily checked so that the alignment of the measurement rolls with respect to the subject roll is performed accurately and quickly.

In addition, since the laser signal emitted from the subject position fix unit is reflected in the relative position measurement unit by itself and the reflected laser signal is received, the alignment of the measurement roll with respect to the subject roll is accurately measured and output even with a sensor with a certain (normal) resolution, regardless of the distance between the rolls, the length of the rolls, and the resolution of the sensor.

In addition, since the laser signal emitted from the subject position fix unit is received only in the reflected-laser signal reception module and the second laser signal receiving module of the relative position measurement unit, it is easy to measure and check the alignment of the rolls other than the skilled person.

In addition, since the alignment of the rolls is converted into a graph (coordinates) that is very easy for a measurer to intuitively recognize and output in real time, it is possible to check and arrange the alignment state of the rolls very easily.

Therefore, the working time to check and align the rolls is shortened.

In addition, by using the present invention, it is possible to construct a roll process line having excellent roll alignment as a method for measuring the alignment state of the measurement rolls that is, the degree of parallelism and the degree of horizontality based on the subject roll.

Accordingly, it is possible to improve the accuracy and durability of the roll process line, and at the same time, it is possible to eliminate the defect rate of the product due to irregular alignment of the rolls.

In addition, due to the characteristics of the configuration, it is possible to check the alignment of the roll process line without disassembling the roll, and it has excellent space utilization as there is no space limitation on the measurement location.

In addition, when measuring the degree of parallelism among the alignment of the measurement roll with respect to the subject roll, the perspective relationship between the subject roll and the measurement roll can be immediately checked, so that the measurer can intuitively recognize the alignment of the measurement roll.

In addition, data collection for the subject roll and measurement roll is standardized, the work procedure is simplified, and objective analysis is performed by the detection result output unit regardless of the individual's analysis ability, thereby effectively checking the alignment of the roll or improving the reliability of the alignment work.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

1: apparatus for detecting relative positioning information between rolls
2: method for measuring roll alignment state using apparatus for detecting relative positioning information between rolls
100: subject position fix unit
110: laser transmitter
200: relative position measurement unit
210: first laser receiver
211: first laser signal reception module
212: first laser signal sensor module
220: second laser receiver
221: second laser signal reception module 222: second laser signal sensor module
230: third laser receiver
231: received-laser signal reflection module
232: reflected-laser signal reception module
233: reflected-laser signal sensor module
240: relative position detection controller
241: laser signal storage module
242: detection information transmission module
300: detection result output unit
310: detection information receiver
320: detection information calculator
321: degree of parallelism calculator
322: degree of horizontality calculator
330: detection result outputter
S100: subject position fix unit mounting step
S200: relative position measurement unit mounting step
S300: laser signal discharging step
S400: laser signal receiving step
S410: first laser signal receiving step
S420: second laser signal receiving step
S430: third laser signal receiving step
S431: reflected-laser signal generating step
S432: reflected-laser signal receiving step
S500: laser signal information detecting step
S600: laser signal data transmitting step
S700: measurement roll alignment state calculating step
S800: measurement result output step
S810: first laser signal output step
S811: first reference registering step
S812: first alignment state coordinate calculating step
S813: first measurement correction value storing step
S820: second laser signal output step
S821: second reference registering step
S822: second alignment state coordinate calculating step
S823: second measurement correction value storing step
S830: third laser signal output step
S831: third reference registering step
S832: third alignment state coordinate calculating step
S833: third measurement correction value storing step
S900: measurement roll aligning step
A: distance between the received-laser signal reflection module (231) and the first laser signal reception module (211)
B: distance between the received-laser signal reflection module (231) and the reflected-laser signal reception module (232)
D: display
L: laser signal
MR: measurement roll
SR: subject roll
L1: a first laser signal
L2: second laser signal
L3: reflected laser signal

BEST MODE

Mode for Invention

Hereafter, the functions, configuration, and operations of an apparatus for detecting relative positioning information between rolls and a method for measuring roll alignment state using the apparatus of the present disclosure are described with reference to the accompanying drawings.

Figure 1:
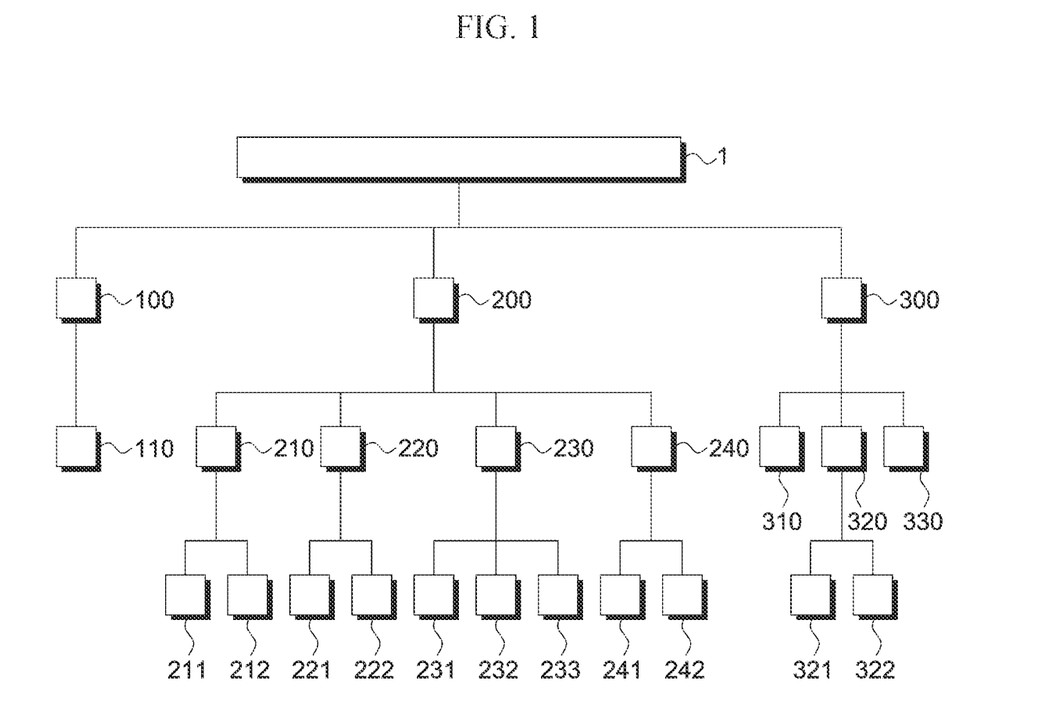
FIG. 1 is a diagram showing the configuration of an apparatus for detecting relative positioning information between rolls of the present invention.
Figure 2:
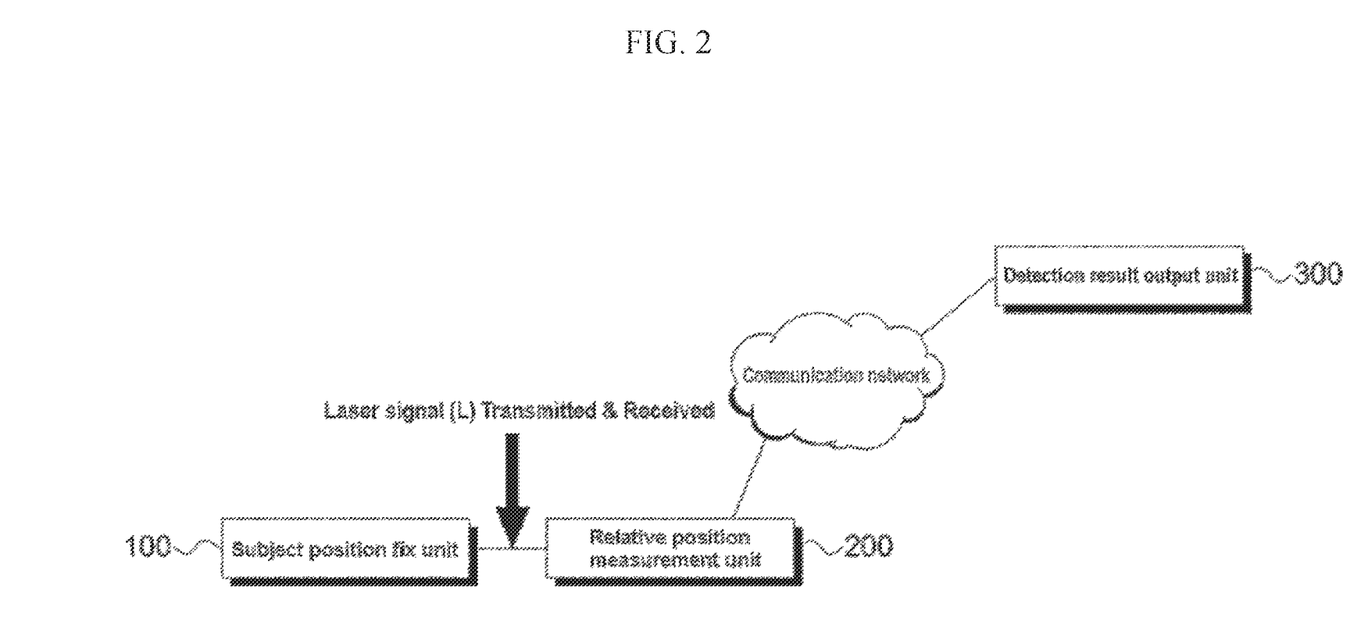
FIG. 2 is a diagram showing the concept of the apparatus for detecting relative positioning information between rolls of the present invention.
Figure 3:
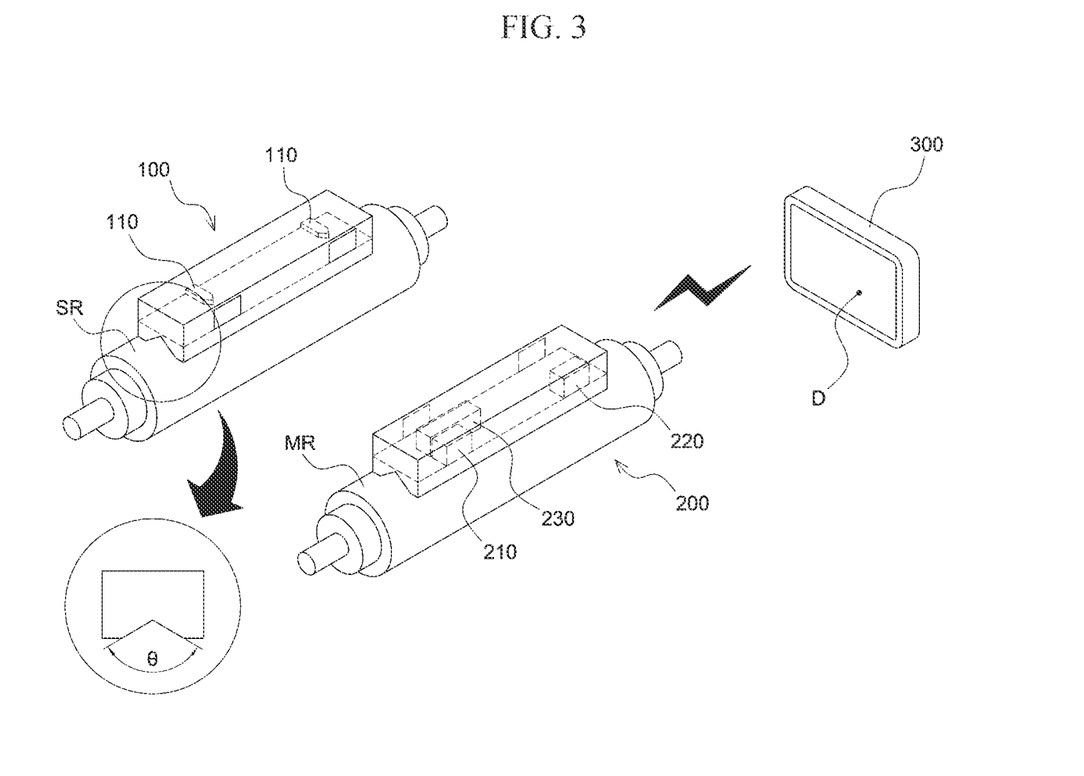
FIG. 3 is a perspective view of the apparatus for detecting relative positioning information between rolls of the present invention.
Figure 4:
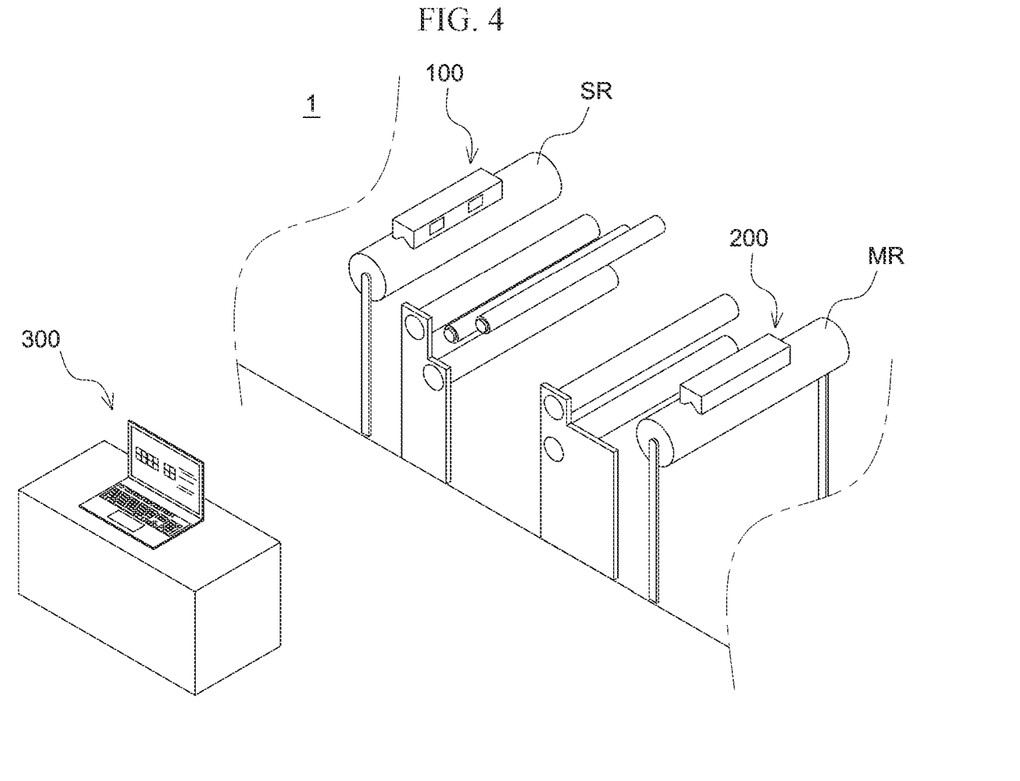
FIG. 4 is a view showing an example where the apparatus for detecting relative positioning information between rolls of the present invention is applied to a site.
Figure 5:
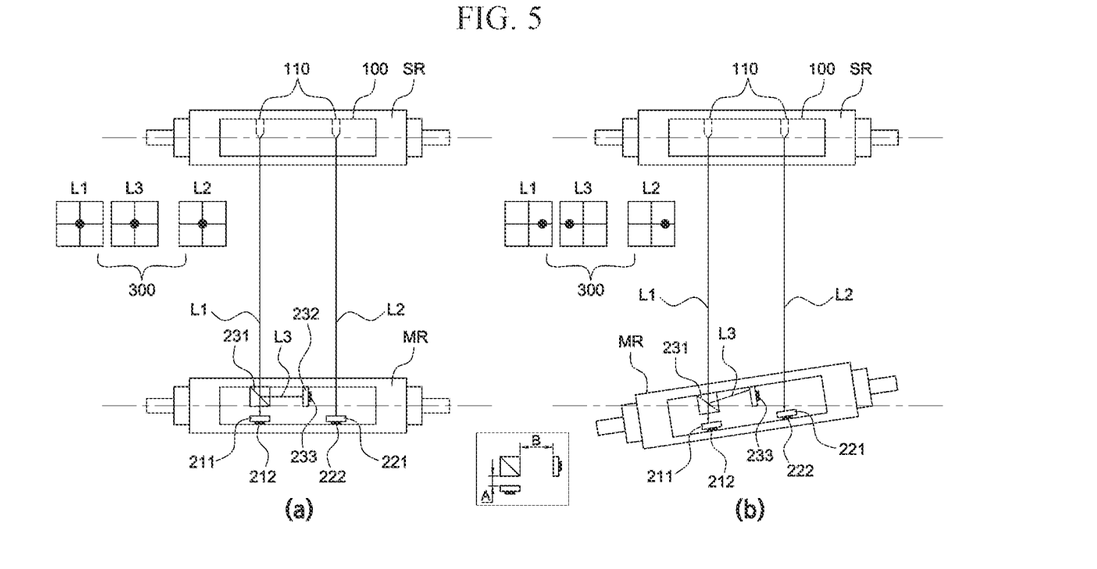
FIG. 5 is a plan view showing an example of measurement by the apparatus for detecting relative positioning information between rolls of the present invention.

FIG. 1 is a diagram showing the configuration of an apparatus for detecting relative positioning information between rolls of the present disclosure, FIG. 2 is a diagram showing the concept of the apparatus for detecting relative positioning information between rolls of the present disclosure, FIG. 3 is a perspective view of the apparatus for detecting relative positioning information between rolls of the present disclosure, FIG. 4 is a view showing an example where the apparatus for detecting relative positioning information between rolls of the present disclosure is applied to a site, and FIG. 5 is a plan view showing an example of measurement by the apparatus for detecting relative positioning information between rolls of the present disclosure.

An apparatus for detecting relative positioning information between rolls of the present disclosure, as shown in FIGS. 1 to 5, includes: a subject position fix unit (100) mounted on a subject roll (SR), that is the reference of measurement, and discharging a laser signal (L) to a measurement roll (MR) to be measured; a relative position measurement unit (200) mounted on the measurement roll (MR) to be measured and receiving the laser signal (L) from the subject position fix unit (100); and a detection result output unit (300) that receives information about the laser signal (L) from the relative position measurement unit (200), calculates the alignment of the measurement roll (MR) with respect to the subject roll (SR), and outputs the alignment to a display (D).

The relative position measurement unit (200) includes:
a first laser receiver (210) that receives a first laser signal (L1) from the subject position fix unit (100);
a second laser receiver (220) that receives a second laser signal (L2) from the subject position fix unit (100); and
a third laser receiver (230) that reflects and receives the first laser signal (L1) from the subject position fix unit (100).

The third laser receiver (230) includes:
a received-laser signal reflection module (231) that passes and reflects the first laser signal (L1) from the subject position fix unit (100) such that the passed first laser signal (L1) is radiated to the first laser receiver (210) and the reflected laser signal (L3) generated by reflection is radiated to a reflected-laser signal reception module (232);
the reflected-laser signal reception module (232) to which the reflected laser signal (L3) is radiated; and
a reflected-laser signal sensor module (233) that stores the reflected laser signal (L3) radiated to the reflected-laser signal reception module (232) into data.

The alignment state of the measurement roll (MR) with respect to the subject roll (SR) is output to the display (D) in real time on the basis of data transmitted from the relative position measurement unit (200).

That is, the present disclosure provides a detection apparatus in which the subject position fix unit (100) is mounted on the subject roll (SR) to be reference of measurement in a roll process line of which the alignment state is examined or checked, the relative position measurement unit (200) is mounted on the measurement roll (MR) that is the target of measurement, the alignment of a roll is checked by the detection result output unit (300) analyzing information created by transmission/reception of a laser signal (L) between the subject position fix unit (100) and the relative position measurement unit (200) such that a measurer can easily align the measurement roll (MR) on the basis of the alignment.

In more detail, the subject position fix unit (100) of the apparatus (1) for detecting relative positioning information between rolls includes a laser transmitter (110) that discharges a first laser signal (L1) and a second laser signal (L2) that is always parallel with the first laser signal (L1), spaced a predetermined distance apart from the first laser signal (L1), and positioned on the same plane as the first laser signal (L1), and radiates two laser signals to the relative position measurement unit (200).

The relative position measurement unit (200) includes:

a first laser receiver (210) that receives a first laser signal (L1) from the subject position fix unit (100);

a second laser receiver (220) that receives a second laser signal (L2) from the subject position unit (100);

a third laser receiver (230) that reflects and receives the first laser signal (L1) from the subject position unit (100); and a relative position detection controller (240) that combines and stores information of the first laser signal (L1), the second laser signal (L2), and the reflected laser signal (L3) received to the first laser receiver (210), the second laser receiver (220), and the third laser receiver (230).

The first laser receiver (210) includes:

a first laser signal reception module (211) to which the first laser signal (L1) discharged from the subject position fix unit (100) is radiated; and a first laser signal sensor module (212) that stores the first laser signal (L1) radiated to the first laser signal reception module (211) into data.

The second laser receiver (220) includes:

a second laser signal reception module (221) to which the second laser signal (L2) discharged from the subject position fix unit (100) is radiated; and a second laser signal sensor module (222) that stores the second laser signal (L2) radiated to the second laser signal reception module (222) into data.

The third laser receiver (230) includes:

a received-laser signal reflection module (231) that passes and reflects the first laser signal (L1) discharged from the subject position fix unit (100) such that the passed first laser signal (L1) is radiated to the first laser receiver (210) and the reflected laser signal (L3) generated by reflection is radiated to a reflected-laser signal reception module (232);

the reflected-laser signal reception module (232) to which the reflected laser signal (L3) generated from the first laser signal (L1) by the received-laser signal reflection module (231) is radiated; and a reflected-laser signal sensor module (233) that stores the reflected laser signal (L3) radiated to the reflected-laser signal reception module (232) into data.

The relative position detection controller (240) includes:

a laser signal storage module (241) that combines and stores data of the first laser signal (L1), the second laser signal (L2), and the reflected laser signal (L3) stored in the first laser signal sensor module (212), the second laser signal sensor module (222), and the third laser signal sensor module (233); and a detection information transmission module (242) that transmits the information combined and stored in the laser signal storage module (241) to the detection result output unit (300).

The relative position detection controller (240) receives, reflects, and makes two laser signals (L) from the subject position fix unit (100) into data.

The detection result output unit (300) includes:

a detection information receiver (310) that receives data from the relative position measurement unit (200);

a detection information calculator (320) that calculates the alignment state of the measurement roll (MR) using a trigonometric ratio on the basis of the data received by the detection information receiver (310); and a detection result outputter (330) that graphs and outputs the result about the alignment state of the measurement roll (MR) calculated from the detection information calculator (320) to the display (D) such that a measurer can check in real time the alignment state of the measurement roll (MR) with respect to the subject roll (SR) through the display (D) and to examine or correct the alignment state of the measurement roll (MR) on the basis of the checked result.

The received-laser signal reflection module (231), as described above, passes and reflects the first laser signal (L1) discharged from the subject position fix unit (100) using a splitter or a mirror such that the passed first laser signal (L1) is radiated to the first laser signal reception module (211) and the reflected first laser signal (L1) is radiated to the reflected-laser signal reception module (232) as the reflected laser signal (L3).

The first laser signal (L1), the second laser signal (L2), and the reflected laser signal (L3) radiated to the first laser signal reception module (211), the second laser signal reception module (221), and the reflected-laser signal reception module (232) are made into data by the first laser signal sensor module (212), the second laser signal sensor module (222), and the reflected-laser signal sensor module (233), combined and stored in the laser signal storage module (241), and transmitted to the detection result output unit (300) through the detection signal transmission module (242), whereby the alignment state of the roll is output to the display (D) in real time on the basis of the data analyzed by the detection result output unit (300).

The detection information calculator (320) of the detection result output unit (300) detects and measures alignment state using a trigonometric ratio on the basis of the data received from the relative position measurement unit (200) through the detection information receiver (310) and the relationship between the first laser signal (L1) and the received-laser signal reflection module (231) receiving the first laser signal (L1) (the identity of the incident angle and the reflective angle received to and discharged from the splitter or the mirror).

That is, the detection result calculator (320) includes:

a degree of parallelism calculator (321) that calculates degrees of parallelism the subject roll (SR) and the measurement roll (MR) on the basis of the data acquired through the first laser receiver (210) and the third laser receiver (230); and a degree of horizontality calculator (322) that calculates degrees of horizontality of the subject roll (SR) and the measurement roll (MR) on the basis of the data acquired through the first laser receiver (210) and the second laser receiver (220).

The degree of parallelism calculator (321) and the degree of horizontality calculator (322) measure the degree of parallelism and the degree of horizontality between the subject roll (SR) and the measurement roll (MR), respectively, using a trigonometric ratio.

In particular, in the relative position measurement unit (200), a value to be naturally measured by the received-laser signal reflection module (231) is processed one time for the first laser signal (L1) discharged from the subject position fix unit (100). Accordingly, the alignment state of the roll is minutely output to the detection result output unit (300) about whether it is a simple parallel movement measurement value or whether the alignment state is poor even by a sensor having predetermined (normal) resolution without the resolution of the sensor being influenced by the distance between rolls and the lengths of the rolls.

That is, according to detection apparatuses of the related art, even though a subject roll (SR) and a measurement roll (MR) are parallel, for example, even if the measurement roll (MR) has been simply moved parallel with respect to the subject roll (SR), a non-parallel state may be output in the measurement value, so it is difficult for a measurer to check and align the rolls.

However, according to the present disclosure, as described above, since the first laser signal (L1) is radiated to the first laser signal reception module (211) and the reflected-laser signal reception module (232) through the received-laser signal reflection module (231), it is possible to immediately know whether the measurement roll (MR) has been simply moved parallel with respect to the subject roll (SR) or whether the degrees of parallelism are different. Further, it is possible to immediately know that the difference of the degrees of parallelism means whether the measurement roll (MR) is close to or far from the subject roll (SR).

Figure 7:
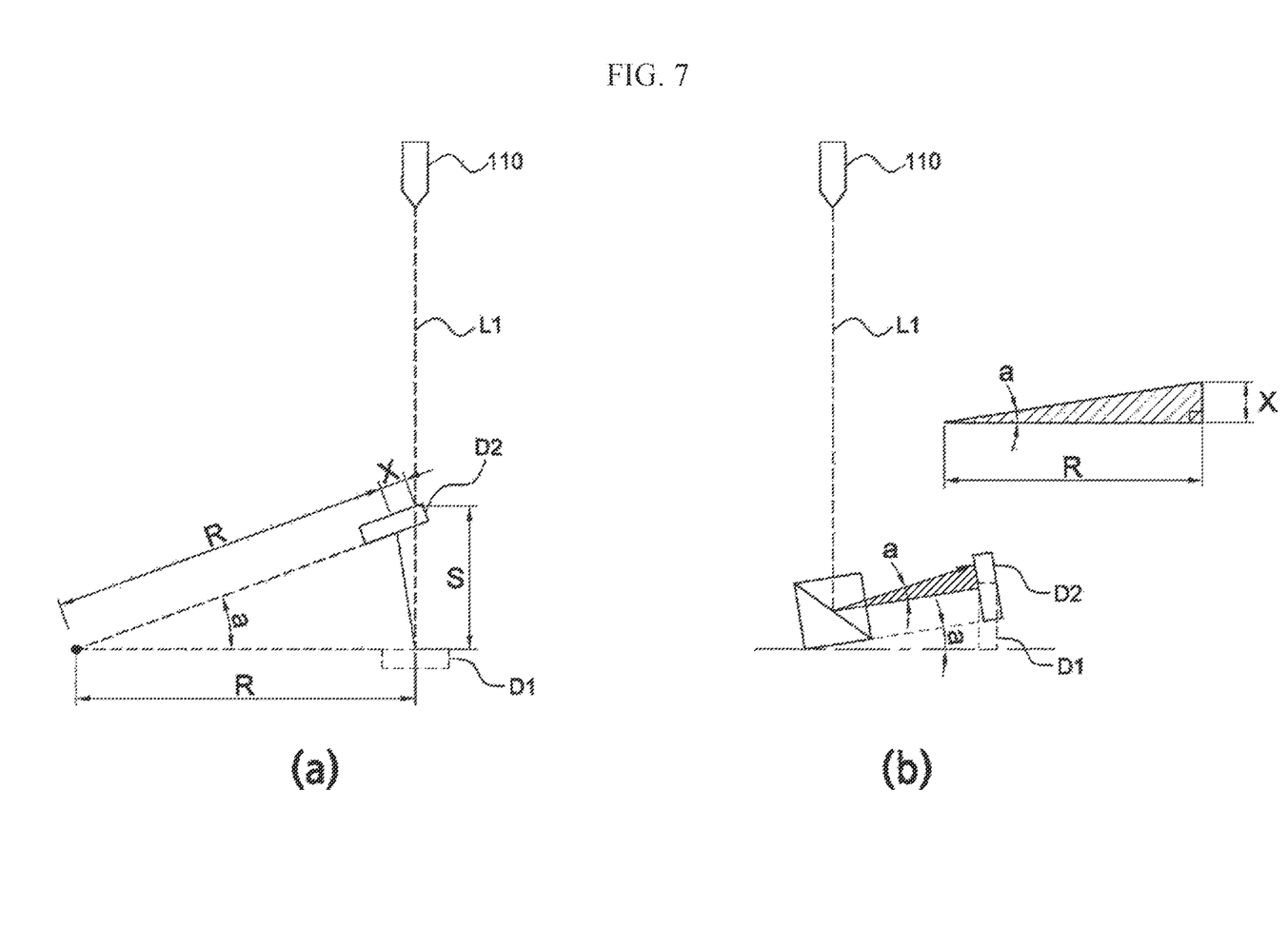
FIG. 7 is a schematic diagram showing the difference on the technical characteristics between an apparatus for detecting relative positioning information between rolls of the present invention and the prior arts.

This is described with the related art with reference to FIG. 7.

For example, FIG. 7A shows the case in which the first laser signal (L1) is received at a detector (D1) (laser signal reception module) in the related art.

For example, assuming that the length (R) of a measurement roll (MR) is 1000 mm and a deviation of the degree of parallelism of the measurement roll (MR) is measured up to 0.01 mm, the resolution of the detector (D1) (laser signal reception module) is as follows:

$S=0.01$ [mm]

$R=1000$ [mm], so $a[\deg]=\tan-1(S/R)=5.73*10^{-4}$, $\cos a=(R/(R+X))$, so $X$ [mm]$=(R/\cos a)-R=5.0*10^{-8}$.

That is, it should be possible to resolve the degree of parallelism up to $10^{-8}$ in order to measure a deviation of the degree of parallelism up to 0.01 mm in the related art.

However, according to the present disclosure shown in FIG. 7B, the resolution under the same condition as FIG. 7A is as follows:

$R=1000$ [mm]

$a[\deg]=5.73\times10^{-4}$, so $X$ [mm]$=R*\tan a=1.0*10^{-2}$.

That is, according to the present disclosure, it is possible to measure a deviation of the degree of parallelism up to 0.01 m as long as it is possible to resolve the parallelism up to $10^{-2}$.

D1 is a detector (laser signal reception module) that is parallel with the subject roller (SR).

D2 is the detector (D1) that has been moved, that is, the detector (laser signal reception module) not parallel by being deviated a predetermined angle from the subject roll (SR).

Further, according to the apparatus (1) for detecting relative positioning information between rolls of the present disclosure, as shown in FIG. 7, considering the characteristic that the incident angle of the first laser signal (L1) radiated to the received-laser signal reflection module (231) and the reflective angle of the reflected laser signal (L3) reflected and discharged is identical, a relationship A<B should be satisfied in the relationship between the distance (A) between the received-laser signal reflection module (231) and the first laser signal reception module (211) and the distance (B) between the received-laser signal reflection module (231) and the reflected-laser signal reception module (232) (this should be applied to derive whether the degrees of parallelism are not identical or whether the degrees of parallelism are identical and the measurement value is due to a simple parallel movement).

If A and B are equal, it is impossible to determine whether the measurement value is caused by simple parallel movement or whether degrees of parallelism is not identical.

The bottoms of the subject position fix unit (100) and the relative position measurement unit (200) are formed in an inverted "V" shape with a predetermined a contained angle (θ).

The contained angle (θ) of the inverted "V" shape is within the range of 140° to 160°, whereby the contact force and the fixing force on the outer surfaces of the subject roll (SR) and the measurement roll (MR) that are separately mounted can be improved.

Figure 6:
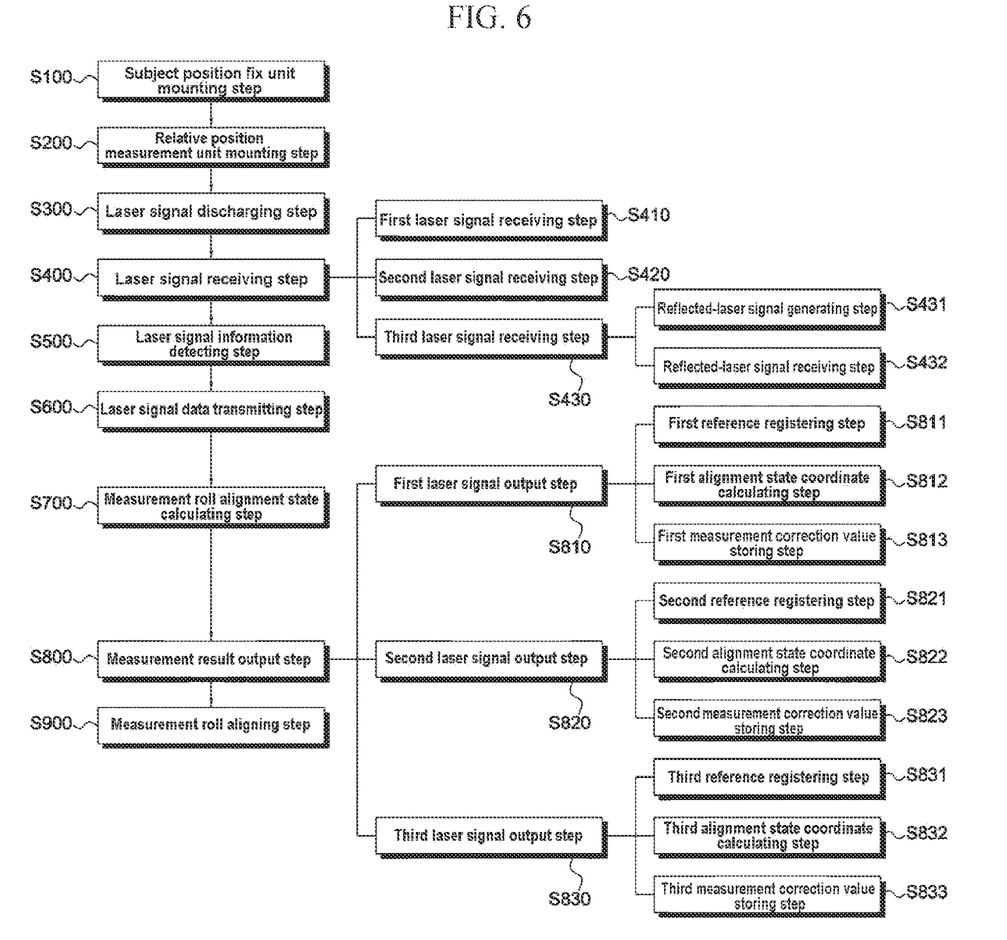
FIG. 6 is a block diagram showing a method for measuring roll alignment state using an apparatus for detecting relative positioning information between rolls.

A method for measuring alignment state of a roll using the apparatus (1) for detecting relative positioning information between rolls described above is described hereafter. A method (2) for measuring alignment state of a measurement roll (MR) with respect to a subject roll (SR) using the apparatus (1) for detecting relative positioning information between rolls includes:

a subject position fix unit mounting step (S100) of mounting the subject position fix unit (100) on a subject roll (SR) that is the reference for measurement;

a relative position measurement unit mounting step (S200) of mounting the relative position measurement unit (200) on a measurement roll (MR) of which the alignment state is measured;

a laser signal discharging step (S300) of discharging a laser signal (L) from the subject position fix unit (100);

a laser signal receiving step (S400) composed of a first laser signal receiving step (S410) of receiving a first laser signal (L1), a second laser signal receiving step (S420) of receiving a second laser signal (L2), and a third laser signal receiving step (S430) of receiving a reflected laser signal (L3) from the discharge laser signal L, the first, second, and reflected laser signals being radiated from the relative position measurement unit (200);

a laser signal information detecting step (S500) of making the received laser signal (L) into data;

a laser signal data transmitting step (S600) of transmitting the data of the laser signal (L) to the detection result output unit (300);

a measurement roll alignment state calculating step (S700) of calculating alignment state of the measurement roll (MR);

a measurement result output step (S800) of outputting in real time the alignment state of the measurement roll (MR) to the display (D); and a measurement roll aligning step (S900) of aligning the measurement roll (MR).

The first laser signal receiving step (S410) receives the first laser signal (L1) that has passed through the received-laser signal reflection module (231).

The third laser signal receiving step (S430) includes:

a reflected-laser signal generating step (S431) of generating the reflected laser signal (L3) from the first laser signal (L1) by means of the received-laser signal reflection module (231); and a reflected-laser signal receiving step (S432) of receiving the reflected laser signal (L3).

When a process line including several rolls continuously installed is formed, the alignment state of the rolls, that is, the degree parallelism and the degree of horizontality of the measurement roll (MR) based on the subject roll (SR) are measured to align the measurement roll (MR) on the basis of the measurement result, whereby a process line with excellent alignment state of rolls is achieved.

The measurement result output step (S800) includes:

a first laser signal output step (S810) of outputting information about the first laser signal (L1);

a second laser signal output step (S820) of outputting information about the second laser signal (L2); and a third laser signal output step (S830) of outputting information about the reflected laser signal (L3).

In detail, the first laser signal output step (S810) includes:

a first reference registering step (S811) of registering coordinate values for the first laser signal (L1) radiated to the first laser signal reception module (211) on the basis of calibration set for the first laser signal reception module (211);

a first alignment state coordinate calculating step (S812) of calculating alignment state of the measurement roll (MR) with respect to the subject roll (SR) from the coordinate values for the first laser signal (L1) registered in the first reference registering step (S811); and a first measurement correction value storing step (S813) of outputting and storing in real time measurement values and correction values for the degree of parallelism and the degree of horizontality of the measurement roll (MR) with respect to the subject roll (SR) calculated in the first alignment state coordinate calculating step (S812).

The second laser signal output step (S820) includes:

a second reference registering step (S821) of registering coordinate values for the second laser signal (L2) radiated to the second laser signal reception module (221) on the basis of calibration set for the second laser signal reception module (221);

a second alignment state coordinate calculating step (S822) of calculating alignment state of the measurement roll (MR) with respect to the subject roll (SR) from the coordinate values for the second laser signal (L2) registered in the second reference registering step (S821); and a second measurement correction value storing step (S823) of outputting and storing in real time measurement values and correction values for the degree of parallelism and the degree of horizontality of the measurement roll (MR) with respect to the subject roll (SR) calculated in the second alignment state coordinate calculating step (S822).

The third laser signal output step (S830) includes:

a third reference registering step (S831) of registering coordinate values for the reflected laser signal radiated to the reflected-laser signal reception module (232) on the basis of calibration set for the reflected-laser signal reception module (232);

a third alignment state coordinate calculating step (S832) of calculating alignment state of the measurement roll (MR) with respect to the subject roll (SR) from the coordinate values for the reflected laser signal (L3) registered in the third reference registering step (S831); and a third measurement correction value storing step (S833) of outputting and storing in real time measurement values and correction values for the degree of parallelism and the degree of horizontality of the measurement roll (MR) with respect to the subject roll (SR) calculated in the third alignment state coordinate calculating step (S832).

A lattice-shaped coordinate target position is calculated using the data acquired by the first laser signal sensor module (211), the second laser signal sensor module (212), and the reflected-laser signal sensor module (233).

Accordingly, the alignment state, that is, the degree of parallelism and the degree of horizontality of the measurement roll (MR) with respect to the subject roll (SR) are converted into coordinates, whereby it is possible to easily and intuitionally recognize the alignment state of the roll.

That is, disclosed is a method of mounting the subject position fix unit (100) on a subject roll (SR) and the relative position measurement unit (200) on a measurement roll (MR), receiving three laser signals (L1, L2, and L3) by reflecting two parallel signals (L1 and L2) discharged from the subject position fix unit (100) in the relative position measurement unit (200), and outputting alignment state of the measurement roll (MR) with respect to the subject roll (SR) to the display (D) through the detection result output unit (300) regardless of the resolution of sensors so that a measurer can recognize the alignment state and correct the measurement roll on the basis of the alignment.

The measurement result output step (S800), as described above, includes the first, second, and third reference registering steps (S811, S821, and S831), the first, second, and third alignment state coordinate calculating steps (S812, S822, and S832), and the first, second, and third measurement correction value storing steps (S813, S823, and S833).

The first reference registering step (S811) checks data of the first laser signal (L1), radiated to the first laser signal reception module (211), generated by the first laser signal sensor module (212), and registers coordinate values of the first laser signal (L1) on the basis of predetermined calibration.

The first alignment state coordinate calculating step (S812) calculates the coordinate values of the first laser signal (L1) registered in the first reference registering step (S811) such that the alignment state of the measurement roll (MR) with respect to the subject roll (SR) is displayed.

The first measurement correction value storing step (S813) checks the alignment state of the measurement roll (MR) with respect to the subject roll (SR) displayed in the first alignment state coordinate calculating step (S812), and outputs and stores in real time measurement values and correction values when the measurement roll (MR) is corrected to be parallel and horizontal with respect to the subject roll (SR).

Similarly, the second reference registering step (S821) checks data of the second laser signal (L2), radiated to the second laser signal reception module (221), generated by the second laser signal sensor module (222), and registers coordinate values of the second laser signal (L2) on the basis of predetermined calibration.

The second alignment state coordinate calculating step (S822) calculates the coordinate values of the second laser signal (L2) registered in the second reference registering step (S821) such that the alignment state of the measurement roll (MR) with respect to the subject roll (SR) is displayed.

The second measurement correction value storing step (S823) checks the alignment state of the measurement roll (MR) with respect to the subject roll (SR) displayed in the second alignment state coordinate calculating step (S822), and outputs and stores in real time measurement values and correction values when the measurement roll (MR) is corrected to be parallel and horizontal with respect to the subject roll (SR).

The third reference registering step (S831) checks data for the reflected laser signal (L3), radiated to the reflected-laser signal reception module (232), generated by the reflected-laser signal sensor module (233), and registers coordinate values of the reflected laser signal (L3) on the basis of predetermined calibration.

The third alignment state coordinate calculating step (S832) calculates the coordinate values of the reflected laser signal (L3) registered in the third reference registering step (S831) such that the alignment state of the measurement roll (MR) with respect to the subject roll (SR) is displayed.

The third measurement correction value storing step (S833) checks the alignment state of the measurement roll (MR) with respect to the subject roll (SR) displayed in the third alignment state coordinate calculating step (S832), and outputs and stores in real time measurement values and correction values when the measurement roll (MR) is corrected to be parallel and horizontal with respect to the subject roll (SR).

For reference, the apparatus 1 for detecting relative positioning information between rolls is applied to a site after the relationship of calibration (zero point) about the parallel and horizontal states of the subject position fix unit (100) and the relative position measurement unit (200) is adjusted through a precise exclusive jig.

That is, the 'predetermined calibration' in the present disclosure may be defined as a coordinate plane having the zero point of coordinate values on the basis of resolution per pixel set by calculating the ratio of the sizes of horizontal and vertical pixels and the actual distances before measuring the alignment state of a roll in a site by, as described above, combining the subject position fix unit (100) and the relative position measurement unit (200) using a precise exclusive jig that can standardize the parallel and horizontal states of the subject position fix unit (100) and the relative position measurement unit (200).

The first, second, and third reference registering steps (S811, S821, and S831), briefly, means storing coordinate values of the laser signals (L1, L2, and L3) radiated to the first and second laser signal reception modules (211 and 221) and the reflected-laser signal reception module (232) on the basis of the 'predetermined calibration'.

The first, second, and third alignment state coordinate calculating steps (S812, S822, and S832) means that the alignment state of the measurement roll (MR) from the subject roll (SR) is checked by comparing the zero point set in advance before measurement with the coordinate values of the laser signals (L1, L2, and L3) stored in the first, second, and third reference registering steps (S811, S821, and S831) by the 'predetermined calibration'.

A 'communication network' shown in FIG. 2 may be defined as a system including wired and wireless communication between the subject position fix unit (100) and the relative position measurement unit (200).

The laser signals (L1 and L2) discharged from the subject position fix unit (100) is received and made into data by the relative position measurement unit (200) and the detection result output unit (300), whereby the alignment state of the measurement roll (MR) with respect to the subject roll (SR) is provided to a measurer in real time.

The 'alignment state' means the degree of parallelism and the degree of horizontality degree including the relation of distance between rolls.

The 'laser signal (L)' generally refers to a first laser signal (L1) or a second laser signal (L2) or a third laser signal, or the first laser signal (L1) and the second laser signal and the third laser signal as a whole.

The detection result output unit (300) of the present disclosure may be defined as a portable electronic device having the display (D) such as a personal computer, a computer, and a tablet PC.

The first laser signal sensor module (212), the second laser signal sensor module (222), and the reflected-laser signal sensor module (233) may be any one of a CDC image sensor (charge coupled device image sensor), a CMOS (complementary metal oxide semiconductor image sensor), or a position sensing detector, and can acquire the positions of the received first and second laser signals (L1 and L2) and the reflected laser signals (L3) as images.

It will be apparent to those skilled in the art that various modifications and variations can be made in the present invention without departing from the spirit or scope of the invention as defined in the appended claims.

This invention can be implemented in many different forms without departing from technical aspects or main features. Therefore, the implementation examples of this invention are nothing more than simple examples in all respects and will not be interpreted restrictively.

INDUSTRIAL APPLICABILITY

The present invention relates to an apparatus for detecting relative positioning information between rolls, and a method for measuring a roll alignment state by using same, and can be applied to contribute to the promotion in manufacturing and sales businesses of manufacturing the same, various industrial sites where the roll process line to which the present invention is applied should be installed, and various industrial fields, in which rolls are installed and used, such as industrial fields involved in the manufacture and production of films, thin membranes, (thin plates), paper, resins, and textiles etc.

The invention claimed is:

1. An apparatus for detecting relative positioning information between rolls, comprising: a subject position fix unit (100) mounted on a subject roll (SR) that is the reference of measurement and discharging a laser signal (L) to a measurement roll (MR) to be measured; a relative position measurement unit (200) mounted on the measurement roll (MR) to be measured and receiving the laser signal (L) from the subject position fix unit (100); and a detection result output unit (300) that receives information about the laser signal (L) from the relative position measurement unit (200), calculates the alignment state of the measurement roll (MR) with respect to the subject roll (SR), and outputs the alignment state to a display (D), wherein the relative position measurement unit (200) includes:
a first laser receiver (210) that receives a first laser signal (L1) from the subject position fix unit (100);
a second laser receiver (220) that receives a second laser signal (L2) from the subject position fix unit (100); and
a third laser receiver (230) that reflects and receives the first laser signal (L1) discharged from the subject position fix unit (100),
wherein the third laser receiver (230) includes:
a received-laser signal reflection module (231) that passes and reflects the first laser signal (L1) discharged from the subject position fix unit (100) such that the passed first laser signal (L1) is radiated to the first laser receiver (210) and the reflected laser signal (L3) generated by reflection is radiated to a reflected-laser signal reception module (232);
the reflected-laser signal reception module (232) to which the reflected laser signal (L3) is radiated; and
a reflected-laser signal sensor module (233) that stores the reflected laser signal (L3) radiated to the reflected-laser signal reception module (232) into data, and
wherein the alignment state of the measurement roll (MR) with respect to the subject roll (SR) is output to the display (D) in real time on the basis of data transmitted from the relative position measurement unit (200).

2. A method for measuring alignment state of a roll using an apparatus for detecting relative positioning information between rolls, the method comprising:

a subject position fix unit mounting step (S100) of mounting a subject position fix unit (100) on a subject roll (SR) that is the reference for measurement;

a relative position measurement unit mounting step (S200) of mounting a relative position measurement unit (200) on a measurement roll (MR) of which alignment is measured;

a laser signal discharging step (S300) of discharging a laser signal (L) from the subject position fix unit (100);

a laser signal receiving step (S400) composed of a first laser signal receiving step (S410) of receiving a first laser signal (L1), a second laser signal receiving step (S420) of receiving a second laser signal (L2), and a third laser signal receiving step (S430) of receiving a reflected laser signal (L3) from the discharge laser signal, the first, second, and reflected laser signals being radiated from the relative position measurement unit (200);

a laser signal information detecting step (S500) of making the received laser signal (L) into data;

a laser signal data transmitting step (S600) of transmitting the data of the laser signal (L) to the detection result output unit (300);

a measurement roll alignment state calculating step (S700) of calculating alignment state of the measurement roll (MR);

a measurement result output step (S800) of outputting in real time the alignment state of the measurement roll (MR) to a display (D); and a measurement roll aligning step (S900) of aligning the measurement roll (MR), wherein the first laser signal receiving step (S410) receives first laser signal (L1) that has passed through the received-laser signal reflection module (231), wherein the third laser signal receiving step (S430) includes:

a reflected-laser signal generating step (S431) of generating the reflected laser signal (L3) from the first laser signal (L1) by means of the received-laser signal reflection module (231); and a reflected-laser signal receiving step (S432) of receiving the reflected laser signal (L3), whereby when a process line including several rolls continuously installed is formed, the alignment state of the rolls, that is, the degree of parallelism and the degree of horizontality of the measurement roll (MR) based on the subject roll (SR) are measured to align the measurement roll (MR) on the basis of the measurement result, so a process line with excellent alignment state of rolls is achieved.

* * * * *